United States Patent
Tepper et al.

(10) Patent No.: US 8,906,835 B2
(45) Date of Patent: Dec. 9, 2014

(54) ALKALI AND ALKALINE EARTH THIADIAZOLE ADDITIVES AND LUBRICATING COMPOSITIONS CONTAINING THE SAME

(75) Inventors: Ronald J. Tepper, Fairfield, CT (US); Gaston A. Aguilar, Milford, CT (US)

(73) Assignee: Vanderbilt Chemicals, LLC, Norwalk, CT (US)

(*) Notice: Subject to any disclaimer, the term of this patent is extended or adjusted under 35 U.S.C. 154(b) by 437 days.

(21) Appl. No.: 13/466,458

(22) Filed: May 8, 2012

(65) Prior Publication Data

US 2012/0289443 A1 Nov. 15, 2012

Related U.S. Application Data

(60) Provisional application No. 61/483,916, filed on May 9, 2011.

(51) Int. Cl.
  *C10M 135/36* (2006.01)
  *C07D 285/12* (2006.01)
  *C08K 5/053* (2006.01)
  *C08K 5/378* (2006.01)

(52) U.S. Cl.
  CPC .............. *C10M 135/36* (2013.01); *C08K 5/053* (2013.01); *C08K 5/378* (2013.01); *C10M 2207/1285* (2013.01); *C10M 2209/103* (2013.01); *C10M 2209/104* (2013.01); *C10M 2219/106* (2013.01); *C10M 221/041* (2013.01); *C10M 2223/043* (2013.01); *C10M 2223/045* (2013.01); *C10N 2210/02* (2013.01); *C10N 2230/06* (2013.01); *C10N 2250/10* (2013.01)
  USPC .......................................... 508/273; 548/142

(58) Field of Classification Search
  CPC .................. C10M 2219/104; C10M 2219/106; C10M 2223/043; C10M 2223/045
  USPC .......................................... 508/273; 548/142
  See application file for complete search history.

(56) References Cited

U.S. PATENT DOCUMENTS

| | | | |
|---|---|---|---|
| 2,905,639 A * | 9/1959 | Krzikalla et al. | 508/273 |
| 5,874,390 A | 2/1999 | Gong et al. | |
| 6,251,840 B1 | 6/2001 | Ward, Jr. et al. | |
| 6,365,557 B1 | 4/2002 | Karol et al. | |
| 6,489,484 B1 | 12/2002 | Karol et al. | |
| 6,620,771 B2 | 9/2003 | Karol et al. | |
| 2003/0207773 A1 | 11/2003 | Lange et al. | |
| 2004/0255819 A1 | 12/2004 | Sinko | |
| 2009/0156444 A1 | 6/2009 | Aguilar et al. | |
| 2009/0298728 A1 | 12/2009 | Brouse et al. | |

FOREIGN PATENT DOCUMENTS

GB          799055 A     7/1958

OTHER PUBLICATIONS

International Search Report Dated July 18, 2012, Mailed Aug. 13, 2012.

* cited by examiner

*Primary Examiner* — Vishal Vasisth
(74) *Attorney, Agent, or Firm* — Norris McLaughlin & Marcus PA

(57) ABSTRACT

An extreme pressure additive composition for use in grease contains alkaline earth metal derivatives of 2,5-dimercapto-1,3,4-thiadiazole (DMTD) complexed to alkylene glycol fluids and or PAG fluids. In addition, additives for extreme pressure and antiwear contain a complex of alkali and/or alkaline earth metal derivatives of DMTD with alkylene glycol fluids and or PAG fluids, in combination with an organophosphorus compound.

17 Claims, No Drawings

ALKALI AND ALKALINE EARTH THIADIAZOLE ADDITIVES AND LUBRICATING COMPOSITIONS CONTAINING THE SAME

This application claims benefit of 61/483,916, filed May 9, 2011.

FIELD OF INVENTION

The present invention relates to compounds which are useful as extreme pressure ("EP") lubricant additives. Specifically, the lubricant additives are complexes of alkaline earth metal derivatives of 2,5-dimercapto-1,3,4-thiadiazole (DMTD) with alkylene glycol and or polyalkylene glycol (PAG) fluids.

The present invention is also directed to an additive composition affording exceptional EP and antiwear properties. More specifically, the invention relates to additive compositions comprising (a) complexes of alkali or alkaline earth metal derivatives of DMTD with alkylene glycol and or PAG fluids and (b) organophosphorus antiwear additives.

BACKGROUND

EP greases function under highly loaded conditions and require highly effective EP additives to prevent scoring and welding. DMTD derivatives are well known in the art as antiwear and EP additives. Examples of DMTD derivatives that are useful as antiwear additives include mono-sulfide and di-sulfide dimers of DMTD as disclosed in U.S. Pat. Nos. 4,517,103 and 5,194,621, maleate adducts of DMTD as disclosed in U.S. Pat. Nos. 5,102,568, 5,055,584 and 5,138,065 and mono-alkylated and thioacetal derivatives as disclosed in U.S. Pat. No. 5,849,925.

DMTD derivatives are also known to provide exceptional anti-welding properties typically measured by 4-Ball Weld Test (ASTM D-2596). However, these derivatives generally exhibit poor anti-scoring properties typically measured by Timken Load Test (ASTM D-2509).

Complexes of DMTD derivatives with PAG fluids are well-known in the art for providing both anti-scoring and anti-welding properties. Examples of DMTD derivatives used to produce thiadiazole/PAG complexes include mono-sulfide and di-sulfide dimers of DMTD, alkali metal salts of DMTD, half and full ester maleate adducts of DMTD, mono-alkyl, mono-alkyloxy and thioacteal derivatives of DMTD and dimerized DMTD as disclosed in U.S. Pat. Nos. 6,365,557, 6,489,484 and 6,620,771.

Although complexes of DMTD derivatives with PAG fluids are excellent EP additives, they do not provide adequate antiwear to satisfy current performance levels and as per U.S. Patent Application 20090156444, only molybdenum dialkyldithiophosphate was effective in improving the antiwear properties of EP greases formulated with these DMTD complexes. In lieu of the above, there still exists a need in the art for DMTD based additive compositions that provide both robust EP and effective antiwear performance, preferably in the absence of expensive and/or toxic metals such as molybdenum and antimony.

SUMMARY OF THE INVENTION

The invention discloses EP additive compositions for use in grease comprised of alkaline earth metal derivatives of 2,5-dimercapto-1,3,4-thiadiazole (DMTD) complexed to alkylene glycol fluids and or PAG fluids.

The invention also discloses additive compositions for use in grease. The additive compositions are comprised of the following compounds:
(a) Complexes of alkali or alkaline earth metal derivatives of DMTD with alkylene glycol fluids and or PAG fluids.
(b) Organophosphorus compounds The invention also relates to a lubricant composition comprising the following components:
(a) Major amount (i.e. >95%) of base grease, such as lithium, lithium complex, aluminum complex, calcium complex organo-clay and polyurea.
(b) (1) Complexes of alkaline earth metal derivatives of DMTD with alkylene glycol fluids and/or PAG fluids; or
(2) (A) Complexes of alkali and/or alkaline earth metal derivatives of DMTD with alkylene glycol fluids and/or PAG fluids, and
(B) Organophosphorus antiwear additives.

The effective range by weight % in a grease for the complexes is from about 0.25-3.0%, preferably about 0.5-2.0% and more preferably about 1.0-1.5%, and most preferred about 1.5%.; the organophoshorous additive may be present in an amount which provide about 50-1500 ppm phosphorus, preferably about 100-1000 ppm, more preferably about 200-500 ppm, and most preferably about 330-400 ppm.

DETAILED DESCRIPTION OF THE INVENTION

The present invention provides novel additive compositions composed of DMTD derivatives complexed to alkylene glycol fluids and or PAG fluids that afford anti-scoring properties to lubricating compositions as measured Timken Load Test. These complexes are composed of alkaline earth metal DMTD derivatives of the following formula:

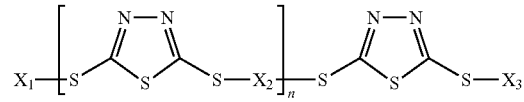

wherein n is 1, $X_1$ is hydrogen, $X_2$ is an alkaline earth metal such as beryllium, magnesium, calcium, strontium, barium and radium, preferably calcium and magnesium and most preferably calcium, and $X_3$ is hydrogen; or wherein n is 0, $X_1$ is an alkali metal such as lithium or potassium, and $X_3$ is hydrogen The alkylene glycol fluids and PAG fluids are of the following formula:

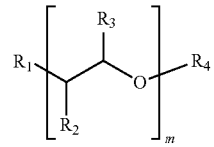

In this formula, $R_1$ is either a hydroxyl radical; a branched or straight chain $C_1$ to $C_{20}$ alkoxy radical, with $C_1$ to $C_{10}$ radical being preferred; a branched or straight chain $C_1$ to $C_{20}$ alkylcarboxyl radical, with $C_1$ to $C_{10}$ radical being preferred; a mono, di or tri-substituted glycerol residue; hydrogen or a combination thereof. $R_2$ and $R_3$ can be hydrogen, a methyl radical, a hydroxymethyl radical, or a hydroxyethyl radical. $R_4$ is either hydrogen; a branched or straight chain $C_1$ to $C_{20}$ alkyl radical, with $C_1$ to $C_8$ radical being preferred; phenyl radical; a branched or straight chain $C_1$ to $C_{20}$ alkyl substituted phenyl radical, with $C_1$ to $C_8$ radical being preferred; a branched or straight chain $C_1$ to $C_{20}$ acyl radical, with $C_1$ to $C_8$ radical being preferred; or a combination thereof. The number of repeating units, m, can range from 1 to 100.

PAG and alkylene glycol fluids falling within the above described parameters are known in the art. Representative examples of the fluids include, but are not limited to, glycerol, 1,4-butanediol, propylene glycol, polyethylene glycol, polypropylene glycol, tetraethylene glycol, triethylene glycol monoethyl ether, triethyleneglycol di-nonanoate, butoxytriglycol, and triethyleneglycol dimethyl ether. One particularly preferred fluid is butoxytriglycol. The glycols and PAG fluids are commercially available from a variety of sources. Preferably, the glycols and PAG fluids have a molecular weight from 62 to 4000, with 340 to 1000 being preferred. The glycols should have a viscosity less than 4000 centistokes at 25° C. for ease of handling. Likewise, the glycols should have a minimal effect on the dropping point of greases.

The complexes are formed by combining the two sole components with or without a solvent and subsequently heating the components or by in-situ production of DMTD derivatives by reaction of DMTD with an alkali or alkaline earth metal source in alkylene glycol and or PAG fluids or by reaction of hydrazine with carbon disulfide and an alkali or alkaline earth metal source in an alkylene glycol and or PAG fluid. The requisite temperature and time needed to facilitate formation of the complexes is variable and can easily be determined by one skilled in the art. The formation of the reaction product can be approximated by observing the dissolution of the DMTD compound, which is solid at room temperature.

The complex may comprise, by weight, from about 10% to 60% thiadiazole and about 40% to 90% diluent; preferably about 25% to 50% thiadiazole and about 50% to 75% diluent; and most preferably about 30% to 40% thiadiazole and about 60% to 70% diluent. The diluents are composed of alkylene glycol fluids and or PAG fluids.

The invention also discloses an additive composition for use in grease. The additive composition is comprised of the following compounds:
(a) complexes of alkali or alkaline earth metal derivatives of DMTD with alkylene glycol and/or PAG fluids
(b) Organophosphorus compounds.

The thiadiazole complexes (a) are composed of alkali and/or alkaline earth metal DMTD derivatives of the following formula:

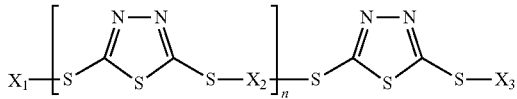

wherein n is 1, $X_1$ is hydrogen, $X_2$ is an alkaline earth metal such as beryllium, magnesium, calcium, strontium, barium and radium, preferably calcium and magnesium and most preferably calcium, and $X_3$ is hydrogen; or wherein n is 0, $X_1$ is an alkali metal such lithium or potassium, and $X_3$ is hydrogen The alkylene glycol and or PAG fluid is of the following formula:

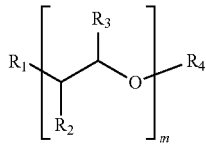

In this formula, $R_1$ is either a hydroxyl radical; a branched or straight chain $C_1$ to $C_{20}$ alkoxy radical, with $C_1$ to $C_{10}$ radical being preferred; a branched or straight chain $C_1$ to $C_{20}$ alkylcarboxyl radical, with $C_1$ to $C_{10}$ radical being preferred; a mono, di or tri-substituted glycerol residue; hydrogen or a combination thereof. $R_2$ and $R_3$ can be hydrogen, a methyl radical, a hydroxymethyl radical, or a hydroxyethyl radical. $R_4$ is either hydrogen; a branched or straight chain $C_1$ to $C_{20}$ alkyl radical, with $C_1$ to $C_8$ radical being preferred; phenyl radical; a branched or straight chain $C_1$ to $C_{20}$ alkyl substituted phenyl radical, with $C_1$ to $C_8$ radical being preferred; a branched or straight chain $C_1$ to $C_{20}$ acyl radical, with $C_1$ to $C_8$ radical being preferred; or a combination thereof. The number of repeating units, m, can range from 1 to 100.

Alkylene glycol and PAG fluids falling within the above described parameters are known in the art. Representative examples of the glycols include, but are not limited to, glycerol, propylene glycol, 1,4-butanediol, polyethylene glycol, polypropylene glycol, tetraethylene glycol, triethylene glycol monoethyl ether, triethyleneglycol di-nonanoate, butoxytriglycol, and triethyleneglycol dimethylether. One particularly preferred glycol is butoxytriglycol. The glycols are commercially available from a variety of sources. Preferably, the glycols have a molecular weight from 340 to 4000, with 340 to 1000 being preferred. The glycols should have a viscosity less than 4000 centistokes at 25° C. for ease of handling. Likewise, the glycols should have a minimal effect on the dropping point of greases.

The complexes are formed by combining the two sole components with or without a solvent and subsequently heating the components or by in-situ production of DMTD derivative by reaction of DMTD with an alkali or alkaline earth metal source in the alkylene glycol and or PAG fluid or by reaction of hydrazine, carbon disulfide and an alkali or alkaline earth metal source in an alkylene glycol and or PAG fluid. The requisite temperature and time needed to facilitate formation of the reaction product is variable and can easily be determined by one skilled in the art. The formation of the reaction produced can be approximated by observing the dissolution of the thiadiazole compounds, which are solids at room temperature.

The complex may comprise, by weight, from about 10% to 60% thiadiazole and about 40% to 90% diluent; preferably about 25% to 50% thiadiazole and about 50% to 75% diluent; and most preferably about 30% to 40% thiadiazole and about 60% to 70% diluent. The diluents are composed of alkylene glycol fluids and or PAG fluids.

Additive compositions of this invention include organophosphorus compounds (b) as antiwear additives. These compounds are selected from a group consisting of phosphates, acid phosphates, amine phosphates, metal dithiophosphates, amine thiophosphates, reaction products of dithiophosphates with unsaturated compounds, phosphites, acid phosphites, phosphonates, phosphonic acids, acid phosphonates, amine phosphonates and mixtures all of the above.

Phosphates and acid phosphates of the invention are of the following general formula:

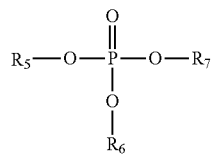

wherein $R_5$, $R_6$ and $R_7$ represent aliphatic groups having 1 to 30 carbon atoms and/or hydrogen and all R groups are aliphatic for phosphates and one or two of the R groups are aliphatic for acid phosphates. As per U.S. Pat. Nos. 3,019,249 and 6,962,895 herein incorporated as references, acid phosphates of this invention are prepared by reacting a phosphorus source with least one alcohol, phenol and/or alkylated phenol. The best known phosphorus source is phosphorus pentaoxide, $P_2O_5$, which reacts with 3 equivalents of alcohol, phenol and/or alkylated phenol to produce a mixture of mono- and di-substituted acid phosphates. Another common phosphorus source is phosphorus oxychloride, $POCl_3$, which can react with 3 or less equivalents of alcohol, phenol and/or alkylated phenols to produce phosphates or mixtures of chlorophosphates that are hydrolyzed to mixtures of mono- and di-substituted acid phosphates. Alcohols for these reactions can be methyl, propyl, butyl, amyl, 2-ethylhexyl, hexyl, octyl, and oleyl alcohols. Examples of commercially available alcohols are also provided in column 17, line 35 to column 18, line 5 of U.S. Pat. No. 6,962,895. Phenols for these reactions are ortho-cresol, meta-cresol, para-cresol and mixtures thereof. As per U.S. Pat. No. 3,019,249, acid phosphates of this invention are also prepared by the reaction of trisubstituted phosphates with phosphoric acid. In reactions, R groups can be alkyl, substituted alkyl, aryl, substituted aryl and mixtures thereof.

Amine phosphates of the invention are formed when acid phosphates are reacted with ammonia, amines or mixtures thereof to produce compounds of the following general formula:

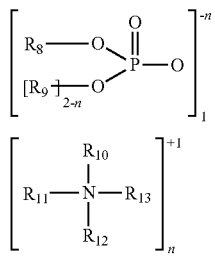

wherein $R_8$ represents an aliphatic group having 1 to 30 carbon atoms; $R_9$ represents hydrogen or aliphatic groups having 1 to 30 carbon atoms; $R_{10}$, $R_{11}$, $R_{12}$ and $R_{13}$ independently represent hydrogen or hydrocarbyl groups in which at least one of the R groups is hydrogen and n is an integer of 1 or 2. The amines used to form the ammonium moiety can be monoamines and polyamines. Useful amines are disclosed in column 22, line 35 to column 28, line 35 of U.S. Pat. No. 6,642,187. Preferred amine composition is a mixture of $C_{11}$-$C_{14}$ tertiary alkyl primary monoamines known as "Primene 81R" manufactured by Rohm and Haas Company.

Metal dithiophosphates of the invention are the following formula:

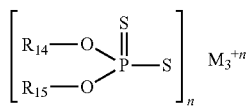

wherein $R_{14}$ and $R_{15}$ independently represent aliphatic groups having 3 to 22 carbon atoms, and $M_3$ represent metals of the periodic table in groups IIA, IIIA, VA, VIA, IB, IIB, VIB, or VIII. Metal dithiophosphates are prepared by reaction of metal bases with one or more dithiophosphoric acids. The metal bases can be any metal compound capable of forming a metal salt. Examples of metal bases include metal oxides, hydroxides, carbonates, and sulfates. The preferred metal base is zinc oxide. The dithiophosphoric acids are prepared by reaction of phosphorus sulfides, which includes phosphorus pentasulfide, phosphorus sequisulfide, and phosphorus heptasulfide with one or more alcohols. Examples of alcohols include isopropyl, isobutyl, n-butyl, sec-butyl, amyl, n-hexyl, methylisobutyl carbinyl, heptyl, 2-ethylhexyl, isooctyl, nonyl, decyl, dodecyl, tridecyl and alkylphenyl alcohols.

Amine thiophosphates of the invention are formed when dithiophosphoric acids or monothiophoshoric acids are reacted with ammonia, amines or mixtures thereof to produce compounds of the following general formula:

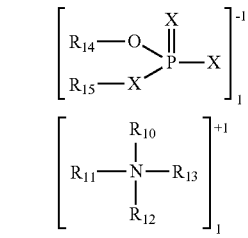

wherein X atoms independently represent O and S, $R_{14}$ and $R_{15}$ independently represent aliphatic groups having 3 to 22 carbon atoms, and $R_{10}$, $R_{11}$, $R_{12}$ and $R_{13}$ independently represent hydrogen or hydrocarbyl groups in which at least one of the R groups is hydrogen. The dithiophosphoric acids are prepared by reaction of phosphorus sulfides, which includes phosphorus pentasulfide, phosphorus sequisulfide, and phosphorus heptasulfide with one or more alcohols. Examples of alcohols include isopropyl, isobutyl, n-butyl, sec-butyl, amyl, n-hexyl, methylisobutyl carbinyl, heptyl, 2-ethylhexyl, isooctyl, nonyl, decyl, dodecyl, tridecyl and alkylphenyl alcohols. The monothiophoshoric acids are typically prepared by the reaction of a sulfur source with a dihydrocarbyl phosphite. Examples of useful sulfur sources include elemental sulfur, sulfur halides, combinations of sulfur or sulfur oxides with hydrogen sulfide, and various sulfurized organic compounds. Elemental sulfur is a preferred sulfur source. The preparations of monothiophosphoric acids are disclosed in U.S. Pat. No. 4,755,311 and PCT Publication WO 87/07638, which are incorporated herein by reference for their disclosure of monothiophosphoric acids, sulfur sources, and the process for making monothiophosphoric acids. The amines used to form the ammonium moiety can be monoamines and polyamines. Useful amines are disclosed in column 22, line 35 to column 28, line 35 of U.S. Pat. No. 6,642,187. Preferred amine composition is a mixture of $C_{11}$-$C_{14}$ tertiary alkyl primary monoamines known as "Primene 81R" manufactured by Rohm and Haas Company.

Reaction products of dithiophosphates with unsaturated compounds to produce compounds of the following formula:

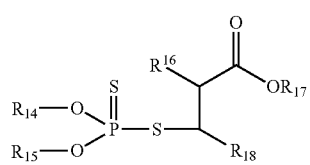

wherein $R_{14}$ and $R_{15}$ independently represent aliphatic groups having 3 to 22 carbon atoms, $R_{16}$ represents hydrogen or methyl, $R_{17}$ represents hydrogen or alkyl groups having 1 to 18 carbons or alcohol substituted alkyl groups having 1 to 18 carbons and $R_{18}$ represents hydrogen, carboxylic acid (—$CO_2H$) or carboxylic acid ester (—$CO_2R$) in which R is an alkyl group having 1 to 8 carbons. Examples useful in the present invention are acrylic acid, methacrylic acid, methyl acrylate, ethyl acrylate, 2-ethylhexyl acrylate, ethyl methacrylate, 2-hydroxyethylmethacrylate, ethyl maleate, butyl maleate, and 2-ethylhexyl maleate.

Acid phosphites of the invention are dihydrocarbyl phosphite of the following formula:

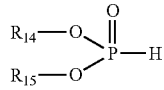

wherein $R_{14}$ and $R_{15}$ independently represent aliphatic groups having 3 to 22 carbon atoms. Preferred aliphatic groups are alkyl and various names are used to describe these compounds including dialkyl hydrogen phosphite, bis(hydroxyalkyl)phosphine oxide, dialkyloxyphosphine oxide, dialkyl acid phosphite, dialkyl phosphite, O,O-dialkyl phosphonate, dialkyl phosphorous acid, hydrogen dialkyl phosphite, alkyl phosphonate and phosphorous acid dialkyl ester. Dihydrocarbyl phosphite of the invention may be prepared by reaction of phosphorus trichloride with 3 equivalents of alcohol to produce 1 equivalent of desired product along with 1 equivalent of hydrocarbyl halide and 2 equivalents of hydrochloric acid. For high carbon number hydrogen, preferred method of preparation involves exchange reaction between higher carbon number alcohols, phenols or alkylated phenols with dimethyl hydrogen phosphite, which is also known as bis(hydroxymethyl)phosphine oxide, dimethyloxyphosphine oxide, dimethyl acid phosphite, dimethyl phosphite, O,O-dimethyl phosphonate, dimethyl phosphorous acid, hydrogen dimethyl phosphite, methyl phosphonate and phosphorous acid dimethyl ester. This preparation is disclosed in U.S. Pat. No. 5,523,005, which are incorporated herein by reference.

Trialkyl phosphites of the invention are of the following formula:

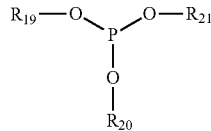

wherein R25, R26, and R27 are aliphatic groups having 3 to 22 carbon atoms. Trialkyl phosphites can be prepared by treating a phosphorus tri-halide with three equivalents of an alcohol and a tertiary amine.

Phosphonates of the invention are of the following formula:

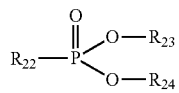

wherein R22, R23, and R24 are hydrocarbyl groups having 3 to 22 carbon atoms. Phosphonates can be made by the Michaelis-Arbuzov reaction in which trialkyl phosphites are treated with alkyl halides, which afford the phosphonate and an alkyl halide as a side product. They can also be produced by treating a trialkyl phosphite with a carboxylic acid derivative such as an acid chloride to form alpha keto phosphonates. Alpha keto phosphonates can be converted to hydroxy methylene bis acid phosphonates of the following formula by reaction with acid phosphites:

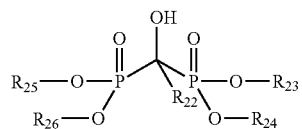

wherein R25, and R26 represent aliphatic groups having 3 to 22 carbon atoms. Phosphonate can then be completely or partially hydrolyzed to respectively produce phosphonic acids and acid phosphonates wherein R23, R24, R25 and/or R26 can be hydrogen, which can then be completely or partially, neutralized with ammonia and/or amines to make amine phosphonates.

Another aspect of the invention concerns lubricating compositions having improved lubricating properties and comprising the following components:
(a) Major amount (i.e. >95%) of base grease, such as lithium, lithium complex, aluminum complex, calcium complex organo-clay and polyurea.
(b) Complexes of alkali and/or alkaline earth metal derivatives of DMTD with alkylene glycol and or PAG fluids.
(c) Organophosphorus antiwear additives.

The lubricating compositions optionally contain the necessary ingredients to prepare the composition. Depending on the intended use of the lubricant, other functional additives may be added to enhance a particular property of the lubricant. The lubricating compositions may also contain one or more of the following additives:
1. Antioxidant compounds
2. Additional extreme pressure additives
3. Rust inhibitors
4. Copper corrosion inhibitors 1. Antioxidant Compounds Antioxidant may be used in the compositions of the present invention, if desired. Typical antioxidants include hindered phenolic antioxidants, secondary aromatic amine antioxidants, hindered amine antioxidants, sulfurized phenolic antioxidants, oil-soluble copper compounds, phosphorus-containing antioxidants, organic sulfides, disulfides and polysulfides and the like.

Illustrative sterically hindered phenolic antioxidants include orthoalkylated phenolic compounds such as 2,6-di-tert-butylphenol, 4-methyl-2,6-di-tert-butylphenol, 2,4,6-tri-tert-butylphenol, 2-tert-butylphenol, 2,6-disopropylphenol, 2-methyl-6-tert-butylphenol, 2,4-dimethyl-6-tert-butylphenol, 4-(N,N-dimethylaminomethyl)-2,8-di-tert-butylphenol, 4-ethyl-2,6-di-tert-butylphenol, 2-methyl-6-styrylphenol, 2,6-distyryl-4-nonylphenol, and their analogs and homologs. Mixtures of two or more such mononuclear phenolic compounds are also suitable.

Other preferred phenol antioxidants for use in the compositions of this invention are methylene-bridged alkylphenols, and these can be used singly or in combinations with each other, or in combinations with sterically hindered un-bridged phenolic compounds. Illustrative methylene-bridged compounds include 4,4'-methylenebis(6-tert-butyl o-cresol), 4,4'-methylenebis(2-tert-amyl-o-cresol), 2,2'-methylenebis(4-methyl-6-tert-butylphenol), 4,4'-methylenebis(2,6-di-tertbutylphenol) and similar compounds. Particularly preferred are mixtures of methylene-bridged alkylphenols such as are described in U.S. Pat. No. 3,211,652, which is incorporated herein by reference.

Amine antioxidants, especially oil-soluble aromatic secondary amines may also be used in the compositions of this invention. Although aromatic secondary monoamines are preferred, aromatic secondary polyamines are also suitable. Illustrative aromatic secondary monoamines include diphenylamine, alkyl diphenylamines containing 1 or 2 alkyl substituents each having up to about 16 carbon atoms, phenyl-.beta.-naphthylamine, phenyl-p-naphthylamine, alkyl- or aralkyl-substituted phenyl-.beta.-naphthylamine containing one or two alkyl or aralkyl groups each having up to about 16 carbon atoms, alkyl- or aralkyl-substituted phenyl-p-naphthylamine containing one or two alkyl or aralkyl groups each having up to about 16 carbon atoms, and similar compounds.

A preferred type of aromatic amine antioxidant is an alkylated diphenylamine of the general formula:

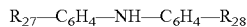

$R_{27}$—$C_6H_4$—NH—$C_6H_4$—$R_{28}$ where R27 is an alkyl group (preferably a branched alkyl group) having 8 to 12 carbon atoms, (more preferably 8 or 9 carbon atoms) and R28 is a hydrogen atom or an alkyl group (preferably a branched alkyl group) having 8 to 12 carbon atoms, (more preferably 8 or 9 carbon atoms). Most preferably, $R^{27}$ and $R^{28}$ are the same. One such preferred compound is available commercially as Naugalube® 438L, a material which is understood to be predominately a 4,4'-dinonyldiphenylamine (i.e., bis(4-nonylphenyl)(amine)) in which the nonyl groups are branched.

The hindered amines are another type aminic antioxidants that may be used in compositions of this invention with two predominating types, the pyrimidines and piperidines. These are all described in great detail above, and in U.S. Pat. No. 5,073,278, U.S. Pat. No. 5,273,669, and U.S. Pat. No. 5,268,113. Preferred hindered amines include 4-stearoyloxy-2,2,6,6-tetramethylpiperidine and dodecyl-N-(2,2,6,6,-tetramethyl-4-piperidinyl)succinate, sold under the trade names Cyasorb® UV-3853 and Cyasorb® UV-3581 from Cytec, di(2,2,6,6-tetramethylpiperidin-4-yl) sebacate and di(1,2,2,6,6-pentamethylpiperidin-4-yl) sebacate, sold as Songlight® 7700 and Songlight® 2920LQ from Songwon, and bis(1-octyloxy-2,2,6,-tetramethyl-4-piperidyl) sebacate, sold as Tinuvin® 123 by Ciba.

Another useful type of antioxidant for preferred inclusion in the compositions of the invention are one or more liquid, partially sulfurized phenolic compounds such as are prepared by reacting sulfur monochloride with a liquid mixture of phenols—at least about 50 weight percent of which mixture of phenols is composed of one or more reactive, hindered phenols—in proportions to provide from about 0.3 to about 0.7 gram atoms of sulfur monochloride per mole of reactive, hindered phenol so as to produce a liquid product. Typical phenol mixtures useful in making such liquid product compositions include a mixture containing by weight about 75% of 2,6-di-tert-butylphenol, about 10% of 2-tert-butylphenol, about 13% of 2,4,6-tri-tert-butylphenol, and about 2% of 2,4-di-tert-butylphenol. The reaction is exothermic and thus is preferably kept within the range of about 15° C. to about 70° C., most preferably between about 40° C. to about 60° C.

Another useful type of antioxidant are 2,2,4-trimethyl-1,2-dihydroquinoline (TMDQ) polymers and homologs containing aromatized terminal units such as those described in U.S. Pat. No. 6,235,686, which is hereby incorporated by reference. Sulfur containing materials such as the methylene bis (dialkyldithiocarbamates) wherein the alkyl group contains 4 to 8 carbon atoms are useful antioxidants. For example, methylenebis(dibutyldithiocarbamate) is commercially available as VANLUBE 7723 from R. T. Vanderbilt Co., Inc).

Mixtures of different antioxidants may also be used. One suitable mixture is comprised of a combination of: (i) an oil-soluble mixture of at least three different sterically hindered tertiary butylated monohydric phenols, which is in the liquid state at 25° C.; (ii) an oil-soluble mixture of at least three different sterically-hindered, tertiary butylated methylene-bridged polyphenols; and (iii) at least one bis(4-alkylphenyl) amine wherein the alkyl group is a branched alkyl group having 8 to 12 carbon atoms, the proportions of (i), (ii) and (iii) on a weight basis falling in the range of 3.5 to 5.0 parts of component (i) and 0.9 to 1.2 parts of component (ii) per part by weight of component (iii), as disclosed in U.S. Pat. No. 5,328,619, which is incorporated herein by reference.

Other useful preferred antioxidants are those included in the disclosure of U.S. Pat. No. 4,031,023, which is herein incorporated by reference.

2. Additional Extreme Pressure Additives

Additional extreme pressure additives that may be used in the invention include but are not limited to other sulfur based EP additives. Examples of such EP additives are sulfurized olefins such sulfurized isobutylene, organic sulfides and polysulfides, such as benzyldisulfide, dibutyl polysulfide, sulfurized sperm oil, sulfurized vegetable and or animal oils, sulfurized methyl ester of oleic acid, sulfurized alkylphenol, sulfurized dipentene, sulfurized terpene, and sulfurized Diels-Alder adducts, metal dithiocarbamates, such as antimony molybdenum and zinc diamyldithiocarbamates.

Other sulfur based EP additives are non metal based DMTD derivatives. Examples of DMTD derivatives that are useful as EP additives include mono-sulfide and di-sulfide dimers of DMTD as disclosed in U.S. Pat. Nos. 4,517,103 and 5,194,621, maleate adducts of DMTD as disclosed in U.S. Pat. Nos. 5,102,568, 5,055,584 and 5,138,065 and mono-alkylated and thioacetal derivatives as disclosed in U.S. Pat. No. 5,849,925, complexes of DMTD derivatives with PAG fluids as disclosed in U.S. Pat. Nos. 6,365,557, 6,489,484 and 6,620,771.

3. Rust Inhibitors

Antirust compounds are known in the art and include but are not limited to alkyl substituted aliphatic dicarboxylic acids such as alkenyl and succinic acids, neutral and overbased alkylbenzene or alkylnaphthalene sulfonates of alkaline earth and alkali metals, sodium nitrite, calcium salts of oxidized paraffin wax, magnesium salts of oxidized paraffin wax, alkali metal salts, alkaline earth metal salts or amine salts of beef tallow fatty acids, alkenyl succinates or alkenyl succinic acid half esters (whose alkenyl moiety has a molecular weight of about 100 to 300), glycerol monoesters, nonylphenyl ethoxylate, lanolin fatty acid esters, and calcium salts of lanolin fatty acids. Combinations may be used.

4. Copper Corrosion Inhibitors

Embodiments of copper corrosion inhibitors that may optionally be added include thiazoles, triazoles and thiadiazoles. Example embodiments of such compounds include benzotriazole, tolyltriazole, octyltriazole, decyltriazole, dodecyltriazole, 2-mercapto-benzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-bis(hydrocarbyldithio)-1,3,4-thiadiazoles.

EXAMPLES

The following examples are given for the purpose of illustrating the invention and are not intended to limit the invention. Examples 1 through 5 illustrate the preparation of complexes of alkali or alkaline earth metal derivatives of DMTD with PAG fluids.

Example 1

Li-DMTD: PAG Complex

A three neck flask was charged with 51.9 g of DMTD (0.3351 moles), 108.6 g of triethylene glycol monobutyl ether, 27.2 g of Carbowax 300, and 11.1 g of water. The flask was attached to a thermocouple and a stirring shaft. 14.2 g of lithium hydroxide monohydrate were then added (0.332 moles). The temperature increased to 53° C. upon addition. Most of the solid dissolved. The reaction mixture was then heated to 114° C. over a period of one hour. The reactor was attached to a Dean Stark apparatus with an aspirator attached. It was heated for an additional 1.5 hours at 114° C. The aspirator was removed. The product was transferred to a storage container. The product (sample 5) contains 1.2% Li, 5.1% N, and 17.5% S.

Example 2

K-DMTD: PAG Complex

A three neck flask was charged with 59.1 g of DMTD (0.3816 moles), 113.8 g of triethylene glycol monobutyl ether, 28.4 g of Carbowax 300, 24.7 g of potassium hydroxide (87.8%, 0.3865 moles), and 15 mL of water. The temperature increased to 51° C. upon mixing. The reaction was heated further to 98° C. under vacuum. Water was distilled off. The reaction showed solid precipitate, which was removed by filtration with a sintered glass funnel. The product (sample 6) contains 6.7% K, 4.5% N, and 15.0% S.

Example 3

Mg (DMTD)$_2$: PAG Complex

A three neck reaction flask was charged with 49.9 g of DMTD (0.322 moles), 9.5 g of magnesium hydroxide (0.161 moles), 96.8 g of triethylene glycol monobutyl ether, and 24.2 g of Carbowax 300. The reaction flask was attached to a Dean Stark apparatus and gradually heated to 113° C. over a period of one and one half hours. The flask was then attached to an aspirator and heated further to 120° C. After one hour the aspirator was removed and the product was filtered with a sintered glass funnel with diatomaceous earth. The product (sample 3) contains 1.5% Mg, 5.2% N, and 17.3% S.

Example 4

Ca (DMTD)$_2$: PAG Complex

A thiadiazole calcium complex was made by charging a three neck flask with 57.3 grams of DMTD (0.3699 moles), 70.4 g of triethylene glycol monobutyl ether, and 23.5 g of Carbowax 300, and 3.5 mL of water. Upon addition of calcium hydroxide to the reaction flask, the temperature increased to 38° C. A total of 13.9 grams of calcium hydroxide was added (0.1866 moles). The reactor was attached to a Dean Stark apparatus and gradually heated to 112° C. over a period of approximately two hours. An aspirator was attached, and the reactor was heated further to approximately 125° C. Approximately 8 mL of water was collected in the Dean Stark apparatus. The reactor was allowed to cool to room temperature. An additional 46.8 grams of triethylene glycol monobutyl ether were added with 5.6 grams of Carbowax 300. The reactor was heated to 120° C. and filtered with a Buchner funnel with diatomaceous earth. The product (sample 1) contained 3.2% Ca, 5.0% N, and 16.7% S.

Example 5

Ca (DMTD)$_2$: PAG Complex

A thiadiazole calcium complex was made by charging a three neck flask with 13.8 g of calcium hydroxide (0.185 moles), 117.2 grams of triethylene glycol monobutyl ether, 28.9 grams of Carbowax 300, and 18.6 grams of hydrazine monohydrate (0.370 moles). The flask was attached to a nitrogen inlet, a stirring shaft, and a condenser which was attached to a caustic scrubber. The reaction flask was flushed with nitrogen. An addition funnel was charged with 28.6 grams of carbon disulfide (0.376 moles). The carbon disulfide was added to the reaction flask over a period of approximately one hour. The temperature of the reaction was held at 39-58° C. for approximately two hours. Then 39.1 grams additional carbon sulfide (0.514 moles) was added to the addition funnel which was added to the reaction flask over a period of twenty minutes. During the addition of the carbon disulfide, 10 mL of water were also added. The temperature was held at approximately 44° C. for three hours. The reaction was heated further and the temperature gradually increased to 117° C. over a period of four hours. A Dean Stark apparatus was then attached to the reactor. Liquid was collected, and the temperature gradually increased to 121° C. over a period of two hours. The reaction was held under vacuum at 121° C. for 40 minutes. The aspirator was removed, and the product was filtered with a sintered glass funnel. The product (sample 2) contains 3.3% Ca, 5.1% N, and 16.7% S.

Test Methods

Test methods used in this invention to evaluate extreme pressure, and wear properties of grease compositions were the following:

1. 4-Ball EP Test
2. Timken EP Test
3. 4-Ball Wear Test

Four-Ball EP Tests were conducted according to standard procedure described in ASTM D2596. In this test method, one ball is rotated on three evenly spaced static balls while the four balls are completely submerged under the test oil. The test is conducted at a rotating speed of 1800 rpm and 54° C. The test samples are subjected to a series of tests of 10 second duration at increasing loads until welding of the balls occurs. The weld point measured in kgf indicates that the extreme pressure level of the grease has been exceeded. Greases with weld points greater than 250 kgf are typically classified as EP greases.

The Timken test is a well-known standardized test, and described in ASTM D 2509. The Timken test measures the loads at which abrasive wear, i.e. scoring, occur between a rotating cup and stationary block; thus, the higher the Timken OK load, the better the EP properties of the grease. An informal EP ranking based Timken OK load performance is provided below; wherein anything in the range 60-80 (excellent or exceptional) is considered acceptable to industry standards:

TABLE 1

| Timken OK Load, (lb.) | EP Performance Ranking |
|---|---|
| 80 | Exceptional |
| 60-70 | Excellent |
| 50 | Good |
| 40 | Marginal |

Four-Ball Wear Tests are conducted according to standard procedure described in ASTM D4172. In this test method, one ball is rotated on three evenly spaced static balls while the four balls are completely submerged under the test oil. The tests for this invention were conducted at a rotation speed of 1200 rpm under a load of 40 kg for one hour at 75° C. The scar diameter of three static balls is measured and the result is the average of the three. An acceptable result for this test is an average wear scar that is less 0.5 mm in diameter.

Examples A-E

Examples A through E are lubricating compositions consisting of untreated NLGI 2 lithium 12-hydroxy stearate grease and the same grease treated with commercial DMTD dimer PAG complex known VANLUBE® 972M and inventive additive compositions of Examples 3 and 4. As per Table 2, EP properties of the two comparative and two inventive grease compositions were measured using 4-Ball EP Test. The data shows that all inventive products improve EP properties of grease and are equally effective as VANLUBE® 972M in increasing the weld point of the grease.

TABLE 2

Base Grease: NLGI 2 Lithium 12-Hydroxy Stearate

| Example | VANLUBE® 972M (Wt. %) | Inventive Additive Example | Wt. % | 4-Ball EP, Weld Point, (kgf) |
|---|---|---|---|---|
| A (Comparative) | — | — | — | 160 |
| B (Comparative) | 1.5 | — | — | 315 |
| C | — | 3 | 0.25 | 250 |
| D | — | 3 | 1.5 | 315 |
| E | — | 4 | 1.5 | 315 |

VANLUBE 972M is DMTD dimer complex with PAG fluids supplied by R. T. Vanderbilt Company, Inc.

Examples F-I

Examples F through I are lubricating compositions consisting of NLGI 2 lithium 12-hydroxy stearate grease treated with sulfurized isobutylene (SIB) containing 45% sulfur and same grease treated with additional SIB, VANLUBE® 972M or inventive Ca (DMTD)$_2$: PAG Complex of Example 4. As per Table 3, EP properties of the three comparative and one inventive composition were measured using 4-Ball EP Test. The data shows that Ca (DMTD)$_2$: PAG Complex is more effective than SIB and equally effective as VANLUBE 972M in increasing the weld point of the grease.

TABLE 3

Base Grease: NLGI 2 Lithium 12-Hydroxy Stearate

| Example | SIB, (wt. %) | VANLUBE® 972M, (Wt. %) | Example 4 Ca (DMTD)$_2$: PAG Complex | Total Sulfur, (Wt. %) | 4-Ball EP, Weld Point, (kgf) |
|---|---|---|---|---|---|
| F (Comparative) | 1.0 | — | — | 0.45 | 315 |
| G (Comparative) | 1.25 | — | — | 0.56 | 315 |
| H (Comparative) | 1.00 | 0.25 | — | 0.51 | 400 |
| I | 1.00 | — | 0.25 | 0.49 | 400 |

Examples J-O

Examples J through O are lubricating compositions consisting of NLGI 2 lithium 12-hydroxy stearate grease treated 0.35% Lubrizol® 1395, a ZDDP supplied by Lubrizol Corporation and same grease treated with VANLUBE® 972M or inventive additive compositions of Examples 1-4. As per Table 4, EP and antiwear properties of the two comparative and four inventive compositions were measured using 4-Ball EP and 4-Ball Wear Tests. The data shows that all inventive products are effective EP additives but unlike VANLUBE® 972M do not negatively impact antiwear performance of organophosphorus compounds.

TABLE 4

Base Grease: NLGI 2 Lithium 12-Hydroxy Stearate

| Example | Lubrizol® 1395, 0.35 Wt. % | VANLUBE® 972M, (Wt. %) | Inventive Additive, 1.5 Wt. % | 4-Ball EP, Weld Point, (kgf) | 4-Ball Wear, (mm) |
|---|---|---|---|---|---|
| J (Comparative) | 330 ppm P | — | — | 200 | 0.49 |
| K (Comparative) | 330 ppm P | 1.5 | — | 400 | 0.59 |
| L | 330 ppm P | — | Example 1 | 315 | 0.49 |
| M | 330 ppm P | — | Example 2 | 315 | 0.48 |
| N | 330 ppm P | — | Example 3 | 315 | 0.50 |
| O | 330 ppm P | — | Example 4 | 315 | 0.43 |

Lubrizol® 1395 is a ZDDP that is supplied by Lubrizol Corporation and contains 9.4% phosphorus.

Examples P-Y

Examples P through Y are lubricating compositions consisting of NLGI 2 lithium 12-hydroxy stearate grease treated inventive additives of Examples 1-5 and inventive additives of Examples 1-5 plus VANLUBE® 9123, an amine phosphate antiwear additive supplied by R. T. Vanderbilt Company, Inc. As per Table 5, EP and antiwear properties of two additive compositions were superior to single additive compositions.

TABLE 5

Base Grease: NLGI 2 Lithium 12-Hydroxy Stearate

| Example | Inventive Additive, 1.5 Wt. % | VANLUBE® 9123, (Wt. %) | Timken OK Load, (lb) | 4-Ball Wear, (mm) |
|---|---|---|---|---|
| P (Comparative) | Example 1 | — | Fail 40 | 0.63 |
| Q | Example 1 | 0.60 | 80 | 0.49 |

TABLE 5-continued

Base Grease: NLGI 2 Lithium 12-Hydroxy Stearate

| Example | Inventive Additive, 1.5 Wt. % | VANLUBE ® 9123, (Wt. %) | Timken OK Load, (lb) | 4-Ball Wear, (mm) |
|---|---|---|---|---|
| R (Comparative) | Example 2 | — | Fail 40 | 0.60 |
| S | Example 2 | 0.60 | 50 | 0.50 |
| T (Comparative) | Example 3 | — | Fail 40 | 0.56 |
| U | Example 3 | 0.60 | 70 | 0.43 |
| V (Comparative) | Example 4 | — | Fail 40 | 0.60 |
| W | Example 4 | 0.70 | 60 | 0.36 |
| X (Comparative) | Example 5 | — | Fail 40 | 0.59 |
| Y | Example 5 | 0.60 | 80 | 0.40 |

VANLUBE ® 9123 amine phosphate antiwear additive supplied by R. T. Vanderbilt Company Inc. It typically contains 5.6% phosphorus. Thus, above grease compositions contain 330 to 400 ppm phosphorus.

What is claimed is:

1. An extreme pressure additive composition for use in grease, comprising alkaline earth metal derivatives of 2,5-dimercapto-1,3,4-thiadiazole (DMTD) complexed to alkylene glycol fluids and/or polyalkylene glycol fluids, wherein the alkaline earth metal derivatives of 2,5-dimercapto-1,3,4-thiadiazole (DMTD) are according to the following formula

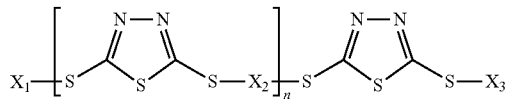

wherein n is 1, $X_1$ is hydrogen, $X_2$ is an alkaline earth metal chosen from the group consisting of beryllium, magnesium, calcium, strontium, barium and radium, and $X_3$ is hydrogen.

2. The additive composition of claim 1, wherein the metal is magnesium or calcium.

3. The additive composition of claim 2, wherein the alkaline earth metal derivatives of 2,5-dimercapto-1,3,4-thiadiazole (DMTD) are complexed with triethylene glycol monobutyl ether.

4. An extreme pressure and antiwear composition for use in grease, comprising:
(a) an alkali and/or alkaline earth metal derivatives of 2,5-dimercapto-1,3,4-thiadiazole (DMTD) complexed to alkylene glycol fluids and/or PAG fluids, and
(b) an organophosphorus compound;
wherein the alkali or alkaline earth metal derivatives of 2,5-dimercapto-1,3,4-thiadiazole (DMTD) are according to the following formula:

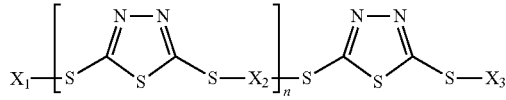

wherein n is 1, $X_1$ is hydrogen, $X_2$ is an alkaline earth metal, and $X_3$ is hydrogen; or wherein n is 0, $X_1$ is an alkali metal, and $X_3$ is hydrogen.

5. The composition of claim 4 wherein the alkali metal is lithium or potassium, and the alkaline earth metal is magnesium or calcium.

6. The composition of claim 5, wherein the alkali or alkaline earth metal derivatives of 2,5-dimercapto-1,3,4-thiadiazole (DMTD) are complexed with triethylene glycol monobutyl ether.

7. The composition of claim 5, wherein the organophosphate compound is an amine phosphate or a metal dithiophosphate.

8. A lubricating composition, comprising:
(a) at least about 95 wt % of a base grease, and
(b) (1) about 0.25-3.0 wt % of a complex of alkaline earth metal derivatives of DMTD with alkylene glycol fluids and/or PAG fluids; or
(2) about 0.25-3.0 wt % of a complex of alkali and/or alkaline earth metal derivatives of DMTD with alkylene glycol fluids and/or PAG fluids; and an organophosphorus antiwear additive in an amount which provides about 50-1500 ppm phosphorus;
wherein the alkali or alkaline earth metal derivatives of 2,5-dimercapto-1,3,4-thiadiazole (DMTD) are according to the following formula:

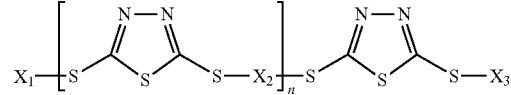

wherein n is 1, $X_1$ is hydrogen, $X_2$ is an alkaline earth metal, and $X_3$ is hydrogen; or wherein n is 0, $X_1$ is an alkali metal, and $X_3$ is hydrogen.

9. The composition of claim 8, wherein the alkali metal is lithium or potassium, and the alkaline earth metal is magnesium or calcium.

10. The composition of claim 9, wherein the alkali or alkaline earth metal derivatives of 2,5-dimercapto-1,3,4-thiadiazole (DMTD) are complexed with triethylene glycol monobutyl ether.

11. The composition of claim 9, wherein the organophosphate compound is an amine phosphate or a metal dithiophosphate.

12. The composition of claim 8, wherein the complex is present at about 0.50-2.0 wt %, and where if (b)(2) is chosen, the organophosphous compound is present in an amount which provides about 100-1000 ppm phosphorus.

13. The composition of claim 12, wherein the complex is present at about 1.0-1.5 wt %, and where if (b)(2) is chosen, the organophosphous compound is present in an amount which provides about 200-500 ppm phosphorus.

14. The composition of claim 9, wherein the complex is present at about 0.50-2.0 wt %, and where if (b)(2) is chosen, the organophosphous compound is present in an amount which provides about 100-1000 ppm phosphorus.

15. The composition of claim 14, wherein the complex is present at about 1.0-1.5 wt %, and where if (b)(2) is chosen, the organophosphous compound is present in an amount which provides about 200-500 ppm phosphorus.

16. The composition of claim 15, wherein the complex is present at about 1.5 wt %, and where if (b)(2) is chosen, the organophosphous compound is present in an amount which provides about 330-400 ppm phosphorus.

17. The composition of claim 16, wherein the organophosphate compound is an amine phosphate or a metal dithiophosphate.

* * * * *